(12) United States Patent  
DeVoll et al.

(10) Patent No.: US 9,095,155 B2  
(45) Date of Patent: Aug. 4, 2015

(54) LOW FLUID VOLUME ANTIMICROBIAL MOLD REDUCTION SYSTEM AND METHOD

(75) Inventors: Joshuah Shane DeVoll, Streamwood, IL (US); Fritz Norbury, Carthage, MO (US); Steven Mallory, Olathe, KS (US)

(73) Assignees: Spraying Systems Co., Wheaton, IL (US); Denisco USA Inc., New Century, KS (US)

( * ) Notice: Subject to any disclaimer, the term of this patent is extended or adjusted under 35 U.S.C. 154(b) by 186 days.

(21) Appl. No.: 13/338,666

(22) Filed: Dec. 28, 2011

(65) Prior Publication Data

US 2012/0100272 A1    Apr. 26, 2012

Related U.S. Application Data

(63) Continuation-in-part of application No. PCT/US2010/040306, filed on Jun. 29, 2010.

(60) Provisional application No. 61/221,092, filed on Jun. 29, 2009.

(51) Int. Cl.

| | |
|---|---|
| *A23C 19/11* | (2006.01) |
| *B05B 15/08* | (2006.01) |
| *B05B 1/04* | (2006.01) |
| *A21D 15/08* | (2006.01) |
| *A23L 3/3463* | (2006.01) |
| *A23L 3/3589* | (2006.01) |

(52) U.S. Cl.
CPC .............. *A23C 19/11* (2013.01); *A21D 15/08* (2013.01); *A23L 3/34635* (2013.01); *A23L 3/3589* (2013.01); *B05B 1/04* (2013.01); *B05B 15/08* (2013.01)

(58) Field of Classification Search
CPC ..... A23L 3/3481; A23L 3/3589; B05B 15/00; A21D 15/08; A23C 19/11  
USPC ............ 426/335, 310, 326, 532, 549; 99/487, 99/516; 118/24  
See application file for complete search history.

(56) References Cited

U.S. PATENT DOCUMENTS

| | | |
|---|---|---|
| 6,589,580 B1 | 7/2003 | Thakar et al. |
| 2007/0166441 A1* | 7/2007 | Adams et al. ................. 426/335 |
| 2008/0217437 A1 | 9/2008 | Berghe et al. |
| 2009/0123620 A1 | 5/2009 | Hiti et al. |

* cited by examiner

*Primary Examiner* — Rena L Dye  
*Assistant Examiner* — Lela S Williams  
(74) *Attorney, Agent, or Firm* — Leydig, Voit & Mayer, Ltd.

(57) ABSTRACT

A system for treating a food product with a mold inhibitor via spray application in suspended form includes a conveyor for moving the food product as well as at least one upper spray nozzle above the conveyor and at least one lower spray nozzle located below the conveyor. In an embodiment of the invention, one or more end spray nozzles are provided to spray one or more vertical end surfaces of the food product. A fluid supply system for supplies pressurized fluid to the spray nozzles. In an embodiment of the invention, the fluid supply system includes a recirculating reservoir for maintaining the mold inhibitor in suspension. The spray guns are controlled via pulse width modulation such that the instantaneous flow rate and the time averaged flow rate are equal to respective predetermined allowable flow rates.

20 Claims, 12 Drawing Sheets

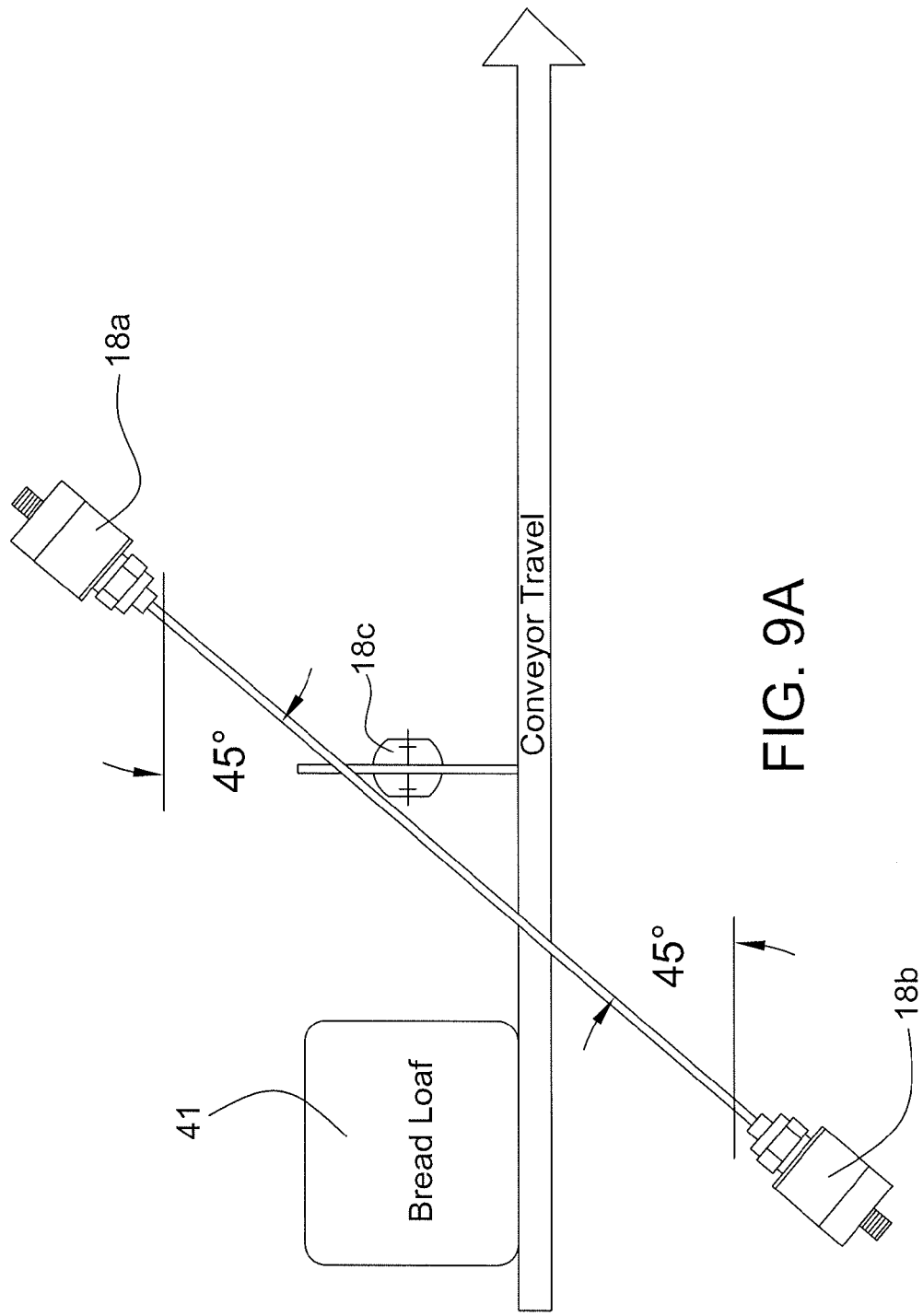

LOW FLUID VOLUME ANTIMICROBIAL MOLD REDUCTION SYSTEM AND METHOD

CROSS-REFERENCE TO RELATED APPLICATIONS

This patent application is a continuation-in-part of PCT International Application No. PCT/US2010/040306, and claims the benefit of U.S. Provisional Patent Application No. 61/221,092, filed Jun. 29, 2009, which is incorporated by reference.

FIELD OF THE INVENTION

The present invention relates generally to the automated preservation of food products via the application of an antimicrobial substance, and, more particularly to a system and method for automatically and efficiently treating non-wet food products with a mold inhibitor via uniform spray application in suspended form.

BACKGROUND OF THE INVENTION

Over the course of the last century, food production shifted further and further away, in terms of both time and distance, from the point of consumption. For example, a loaf of bread may now be baked and packaged hundreds of miles away from where it is eventually consumed, and may spend a week or more in transportation and storage before being sold to the end consumer. For this reason, it has long been important to preserve certain food products after production and before placing those products into the stream of commerce.

While "wet" products such as processed meet are susceptible to bacterial outgrowth, non-wet products such as bread, English muffins, cheese, and tortillas are more susceptible to mold growth. Although it is known to apply mold inhibitors to certain such products, it has been difficult to use this technique more generally. Considering a specific example, the agent Natamycin is an effective mold inhibitor that is currently used in cheese and other dairy products.

Although natamycin is usable on baked products, previous application involved use of a spinning disk or drum technology, and large amounts of overspray did not reach the target. As a result, special equipment was needed to catch the overspray and filter it using additional process steps. Additionally, natamycin solution overspray is subject to becoming contaminated with particles from the product being sprayed, airborne contaminates such as flour dust, bacteria or any other airborne particle which could be considered a contaminate, all of which are typically found in a bakery environment. This invention allows precision application of natamycin, greatly reducing the amount of overspray, and therefore eliminating the need to reclaim and recycle the overspray in certain types of applications. Human intake of natamycin is closely regulated by the FDA, which has set a maximum allowable human intake across all food products as well as a maximum allowable cumulative content. Because natamycin is already used in certain dairy products, its maximum level for individual consumption could be exceeded; therefore precision application placement and fluid amounts are critical parameters.

OBJECTS AND SUMMARY OF THE INVENTION

It is an object of the invention to provide a system for automatically treating a food product with a mold inhibitor via uniform spray application in suspended form.

It is yet a further object of the invention to provide a system as described above, wherein the system includes a conveyor for moving the food product in a conveyor plane, an upper spray nozzle located above the conveyor plane and a lower spray nozzle located below the conveyor plane, the spray nozzles being oriented to efficiently and uniformly spray the food product.

It is yet another object of the invention to provide such a system, further including one or more end spray nozzles oriented to spray one or more vertical end surfaces of the food product.

According to yet another additional object of the invention, a fluid supply system is provided for supplying a pressurized suspension of the mold inhibitor to the spray nozzles, the fluid supply system including a system for preventing the mold inhibitor from settling out of suspension.

It is yet another object of the invention to provide a system as noted above, and wherein the spray guns are controlled via pulse width modulation such that both instantaneous flow rate conditions and time averaged flow rate conditions are met.

Other objects and advantages of the invention will become apparent upon reading the following detailed description and upon reference to the drawings, in which:

BRIEF DESCRIPTION OF THE DRAWINGS

FIG. 9A is a schematic side view of a spray system and product being treated at a first stage according to an embodiment of the invention;

Figure 1:
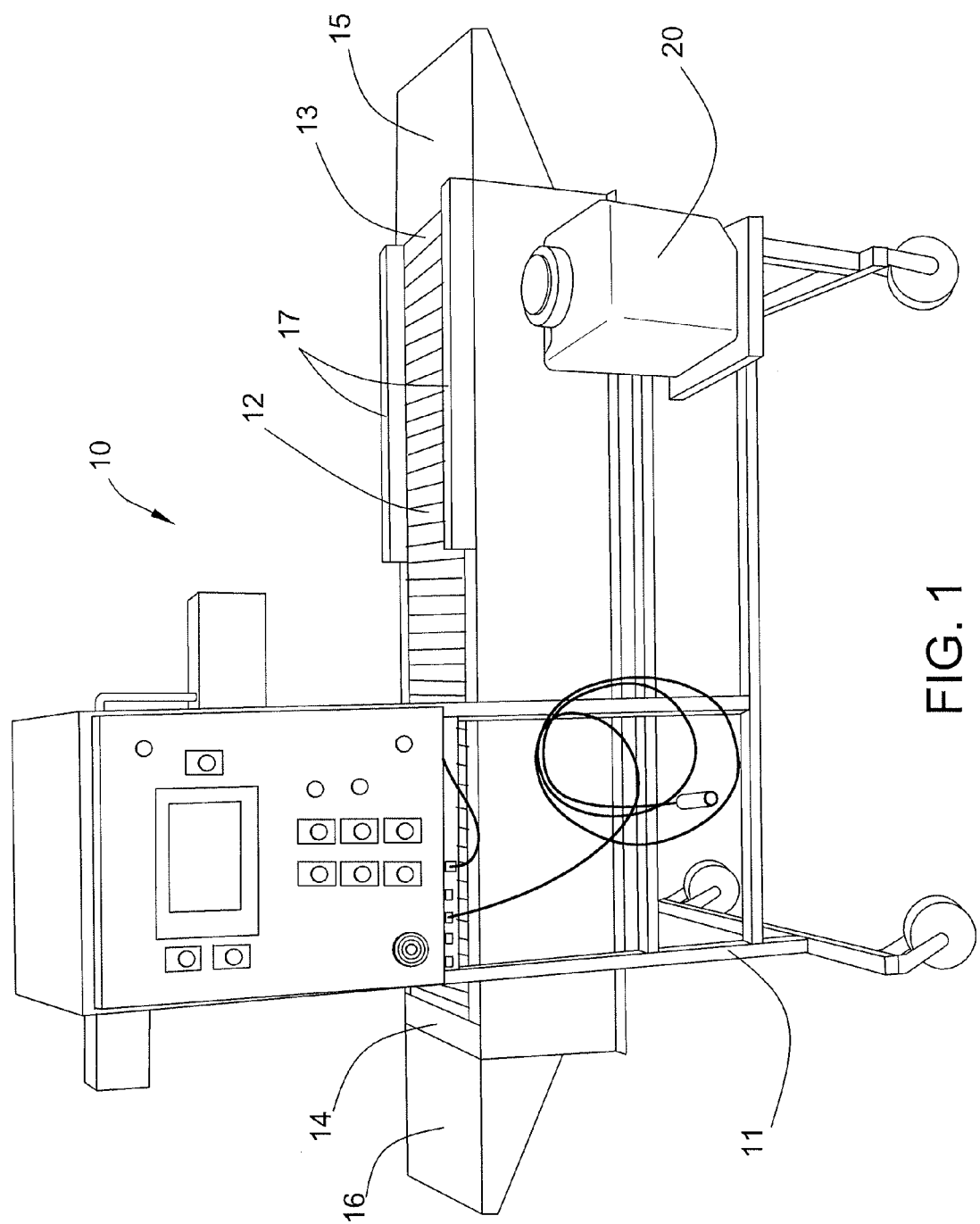
FIG. 1 is a side view of an example system according to an embodiment of the invention.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF THE PREFERRED EMBODIMENTS

Referring now more particularly to the drawings, there is shown an illustrated food processing system 10 operable for spraying antimicrobial compounds, such as Natamycin, onto food products for mold inhibition. It will be understood that while the invention is shown in connection with a system for processing loaves of bread, it may be used for spraying antimicrobial compounds onto other foods, such as cheeses, yogurts, and other food products that require mold control. Furthermore, while the invention is illustrated in connection with food processing, it will be understood that the system may be used for spraying liquid solutions having suspended solids for other applications. Moreover, it will be appreciated that although a single configuration of the system and its components is given herein for the sake of example, numerous other configurations are usable without departing from the principles of the invention disclosed herein.

Figure 2:
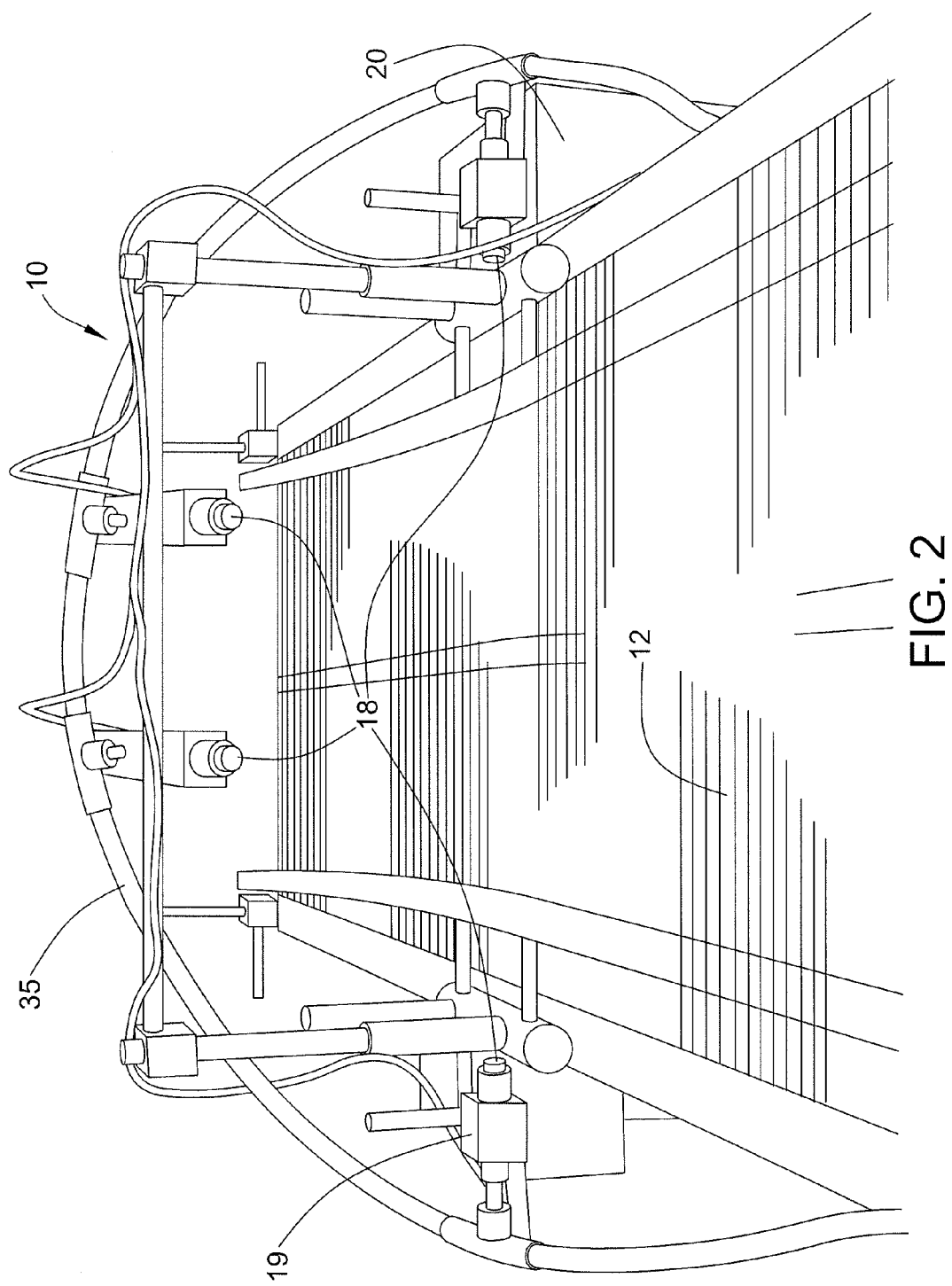
FIG. 2 is a view along the conveyor of the apparatus shown in FIG. 1, showing the location of various spray nozzles and other equipment according to an embodiment of the invention.

The illustrated food processing system 10, as depicted in FIGS. 1 and 2, includes a wheeled stand 11 that supports an endless wire formed conveyor 12 disposed about upstream and downstream pulleys 13, 14, one of which is appropriately power driven. A supply feed table 15 is mounted adjacent an upstream end of the conveyor 12, and a similar discharge table 16 is disposed adjacent a downstream end of the conveyor 12. Appropriate guides 17 are provided for maintaining feed loaves of bread in centered position on the conveyor as they travel the length thereof.

In accordance with the invention, a spraying system is provided for more efficiently and effectively directing a liquid spray of an antimicrobial solution onto the food products while minimizing both liquid requirements and wastage of the relatively expensive antimicrobial compound. The spraying system 10 basically includes a plurality of spray nozzle assemblies 18, each of which, in this case, is part of a respective solenoid control operated spray gun 19, for directing a predetermined liquid spray onto the food products as they travel along the conveyor 12, and a continuously recirculating liquid supply 20 for directing liquid to the spray nozzle assemblies 18 with the antimicrobial compound uniformly dispersed in the solution.

Figure 3:
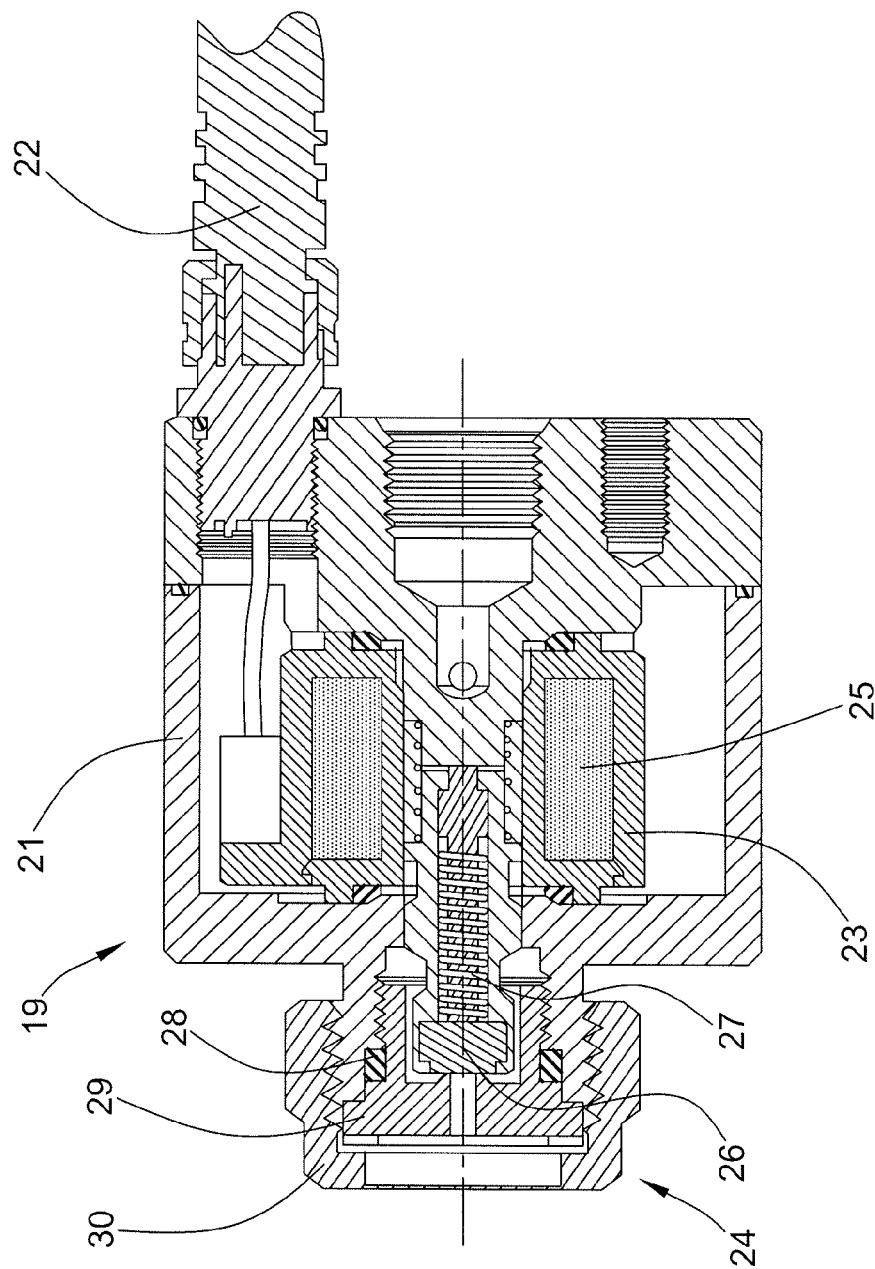
FIG. 3 is a cross-sectional side view of a spray gun assembly usable within the invention.

Referring to FIG. 3, the spray guns 19 in this instance each comprise a body 21 having a liquid inlet threadably connected to a liquid supply line 22, a housing 23, a spray nozzle assembly 24 mounted at a discharge end of the housing 23, a selectively energizable solenoid coil 25 supported within a housing 23 of the spray gun, a valve plunger 26 partially supported within the coil 25 and being mounted for reciprocating linear movement relative to the coil 25 for controlling the discharge of liquid from the nozzle 24, and a spring 27 for biasing the plunger 26 in a closing position. The basic makeup and operation of each spray gun 19 is disclosed in U.S. Pat. No. 7,086,613 assigned to the same assignee as the present application, the disclosure of which is incorporated herein by reference in its entirety. Selective actuation of the solenoid coil 25 is effective for cyclically operating the plunger 26 in a controlled manner for the desired discharge.

Figure 4A:
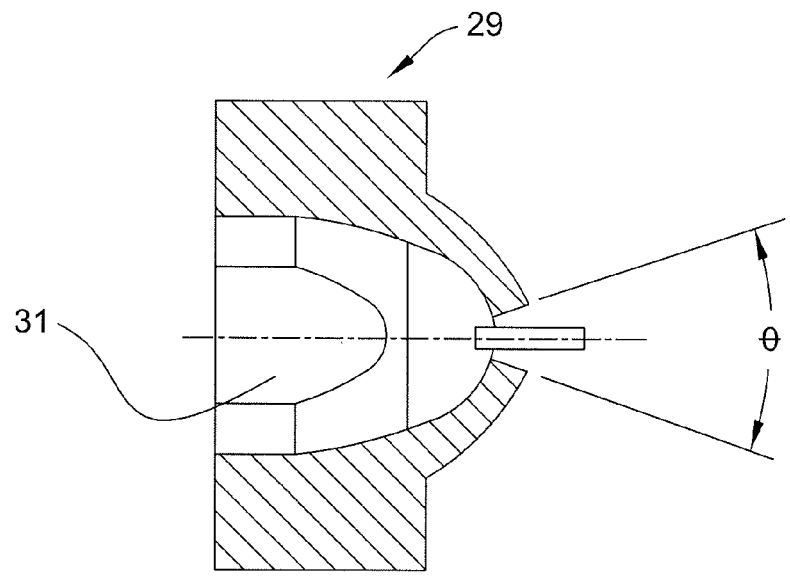
FIG. 4A is a cross-sectional side view of a spray gun nozzle usable within the invention.
Figure 4B:
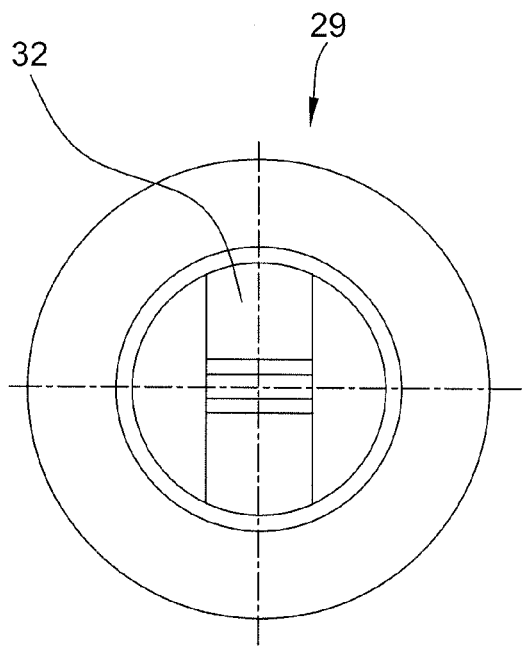
FIG. 4B is a schematic top view of a spray gun nozzle usable within the invention.

The illustrated spray nozzle assemblies 24 each include a nozzle holder 28, a spray tip 29 supported within the nozzle holder 28, and an upstream entry ring 30. For generating a predetermined flat spray pattern with a substantially uniform liquid particle distribution without overspray at opposite edges, the spray tip 29 has a dome shaped downstream end formed with a V-shaped entry passageway 31 that communicates with a generally V-shaped cross cut 32 to define an elongated discharge orifice disposed in a plane perpendicular to the cross cut, as depicted in FIGS. 4A and 4B.

Figure 10:
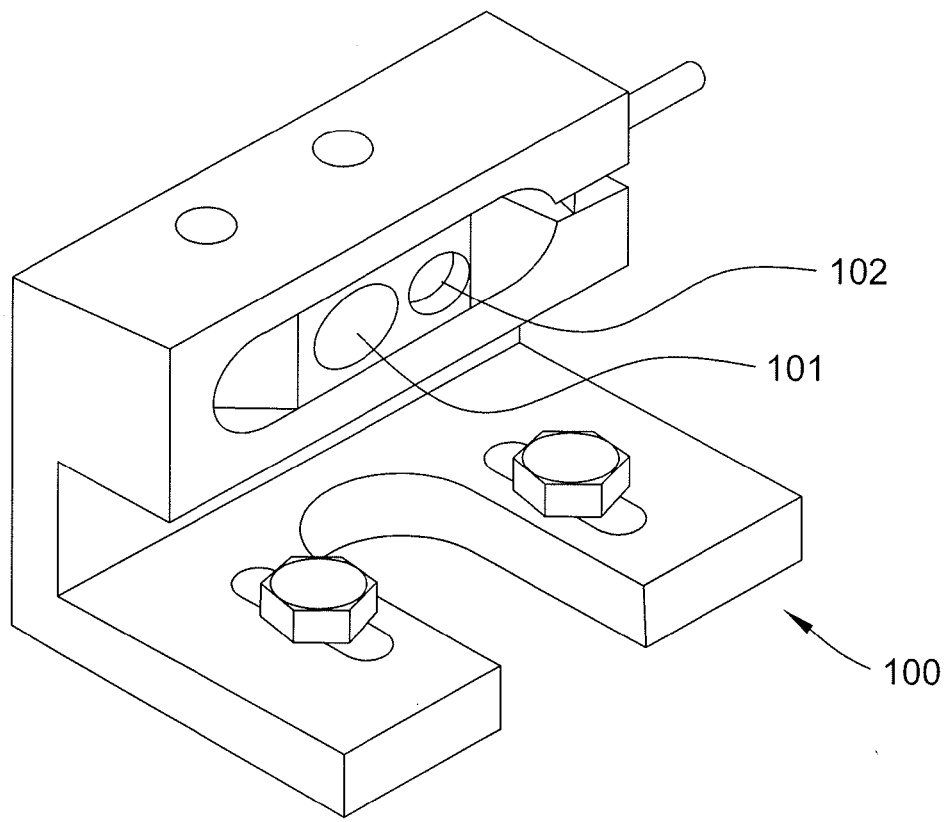
FIG. 10 is a perspective frontal view of a spray check sensor usable within an embodiment of the invention.

One or more of the nozzle assemblies 18 also include a spray check verification sensor mounted adjacent the nozzle tip to detect whether an attempted spray shot was successful. An example of such a sensor is shown in FIG. 10. The illustrated sensor arrangement 100 includes a light emitting diode 101 or other light emitting device for emitting a beam of light onto the spray pattern. A light detector 102 such as a photodiode is also included, in order to detect the reflection of the emitted light from the spray. If no reflect light is detected, the system will infer that there is no spray present, possibly indicating a malfunction.

Figure 5:
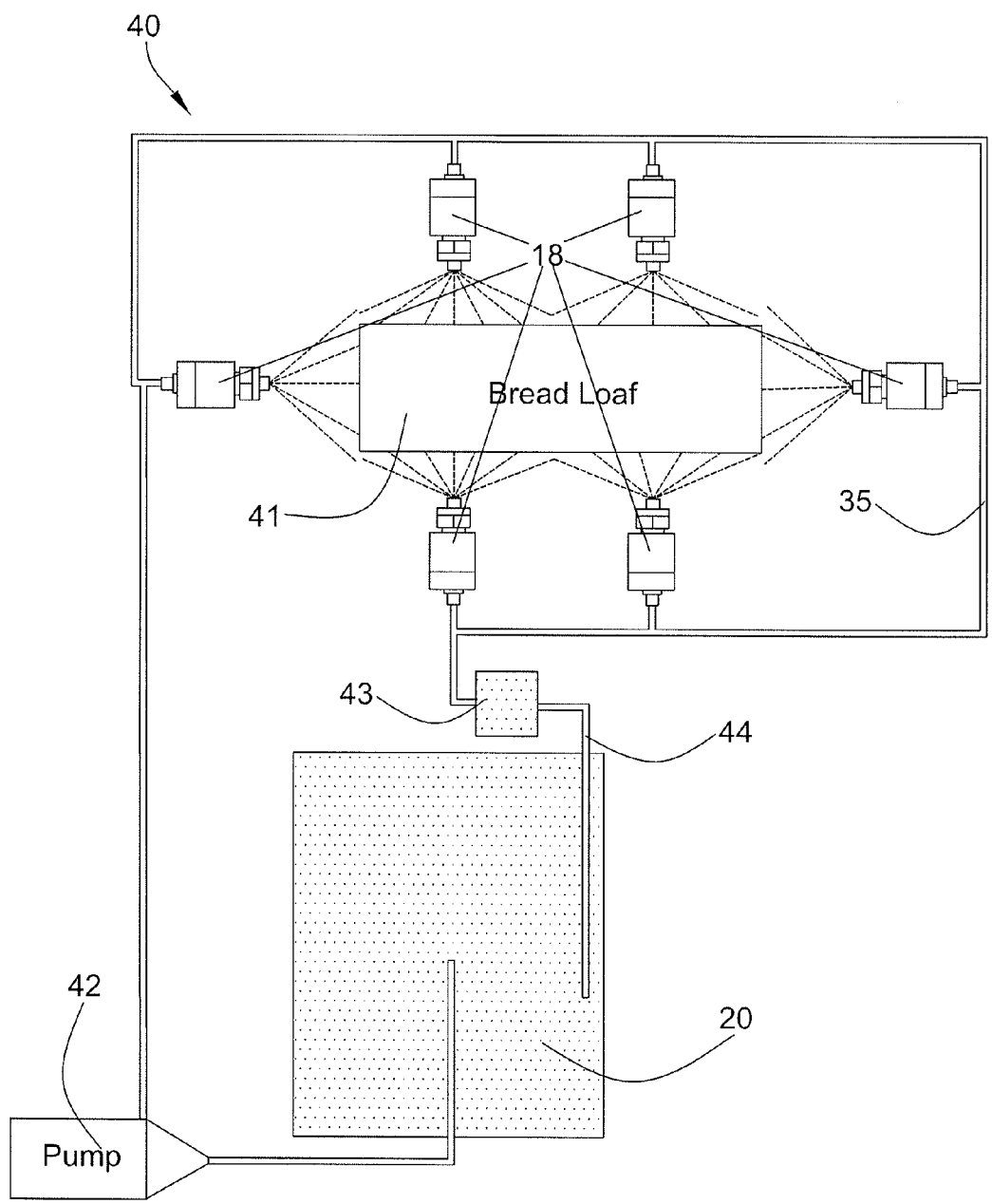
FIG. 5 is a simplified schematic view of a spray system according to an embodiment of the invention.

In keeping with the invention, the spray guns 19 are supported by a frame structure 11 in a surrounding relation to the conveyor 12 and are supplied with liquid from a common liquid supply line 35. The liquid supply line 35 is provisioned via a liquid distribution and recirculation system which will now be discussed in greater detail. FIG. 5 is a schematic overview of the liquid distribution system 40 in keeping with the invention. The major components of the system 40 that are visible in the figure include the liquid supply tank 20, the spray nozzle assemblies 18, the fluid pump 42, common liquid supply line 35, backpressure regulator 43, and return line 44. A bread loaf 41 undergoing treatment is also shown for clarity.

For treating the loaf 41, the fluid pump 42 pulls mixed Natamycin (or other suitable product) suspension from the main tank 20 and pressurizes the common liquid supply line 35 therewith. The spray nozzle assemblies 18 are electrically driven in a manner that will be described in greater detail later herein, so as to controllably spray the loaf 41 with the antimicrobial suspension. To maintain a constant predetermined pressure in the common liquid supply line 35, the backpressure regulator 43 releases liquid from the common liquid supply line 35 when the pressure therein exceeds the desired pressure. From the backpressure regulator 43, the released fluid enters the return line 44, and is directed back into the main tank 20.

Figure 6:
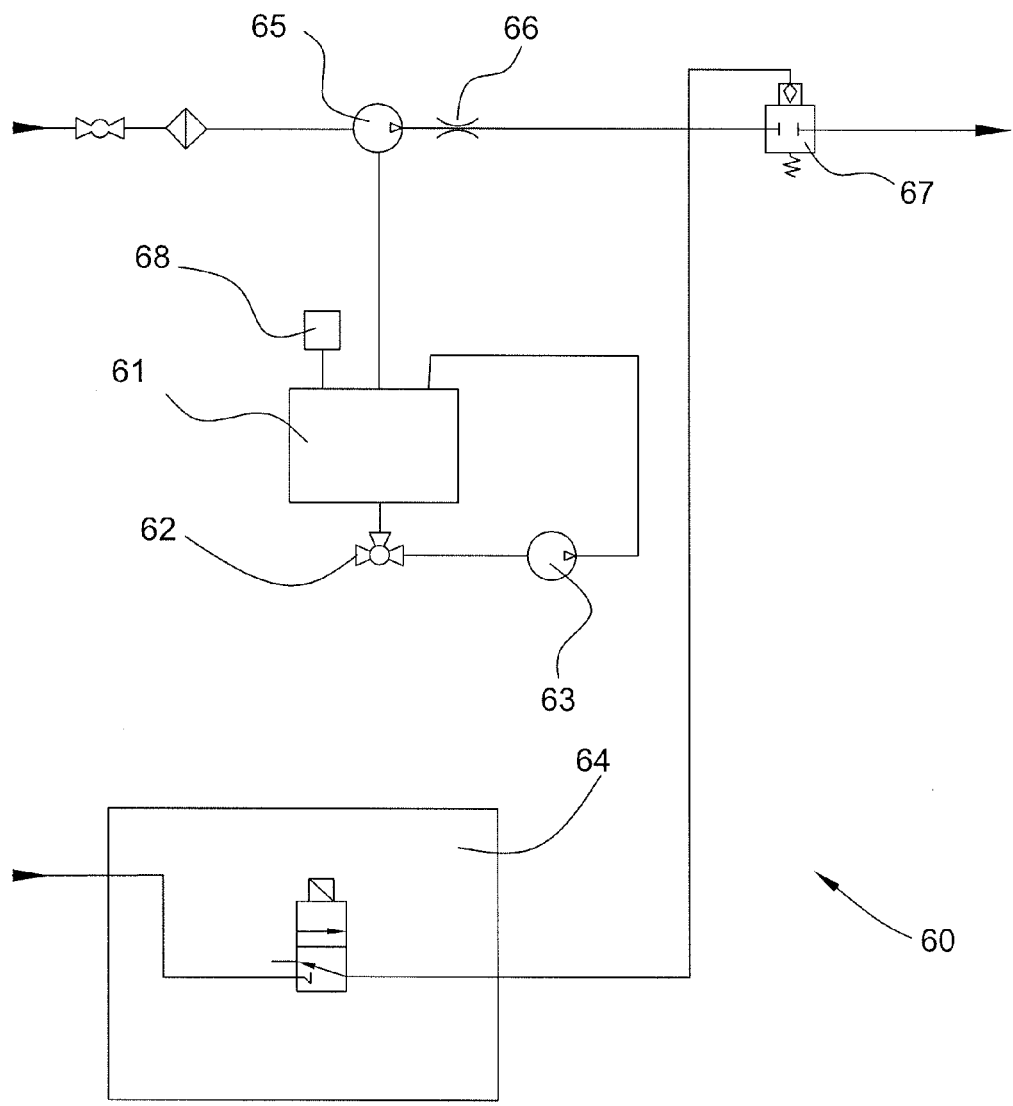
FIG. 6 is a schematic view of a recirculating fluid reservoir system according to an embodiment of the invention.

As noted above, Natamycin and other similar agents are applied via suspension in fluid, as opposed to being fully dissolved in the fluid. This raises the possibility that the agent may settle out of suspension prior to application, resulting in potentially severe inaccuracy in application of the agent. To ensure that the Natamycin or other agent remains in suspension, a concentration recirculation system is provided as shown in FIG. 6. This system 60 holds and maintains a concentrated Natamycin suspension and provides it to the main tank 20 when needed.

The primary elements of the system 60 include a concentrate tank 61, e.g., a small 10 gallon tank, for holding mixed concentrate, an outlet valve 62, a circulation pump 63, and an auto refill circuit 64. The auto refill circuit 64 operates to supply fluid to the main tank 20 via a valve 67 when instructed by a portion of the main circuit as will be discussed below. The system also includes a main pump 65 for mixing the concentrate with additional water and supplying it to the main tank 20. A constrictor 66 ensures that the flow into the main tank is not excessive and also provides back pressure to the main pump 65 so that it can more effectively mix in the additional water.

Any suitable material may be used for the aforementioned elements. In an example of the invention, the main pump 65 is constructed using PVDF (Polyvinylidene Fluoride), the tanks are constructed of polyethylene, and all necessary liquid tubing is made of nylon, Teflon, or other suitable material. One consideration when selecting materials that will contact the suspension is to ensure that the material will not react with or otherwise adversely affect the suspension, e.g., by causing coagulation or other adverse reaction or condition.

Figure 7:
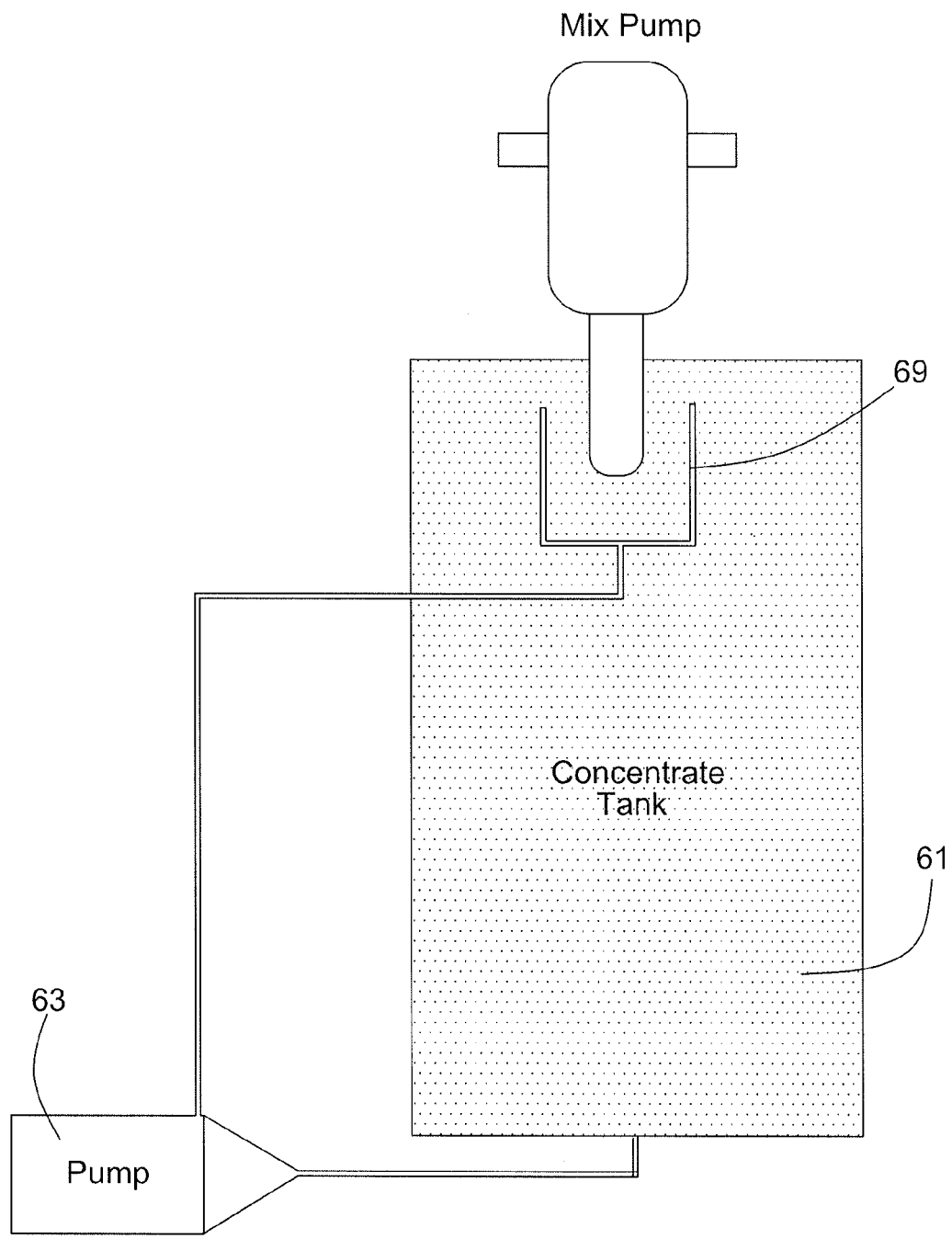
FIG. 7 is a schematic view of a recirculating tank usable within the fluid reservoir system of FIG. 6.

In operation, the aforementioned elements act together to ensure that the Natamycin remains in suspension in the concentrate tank 61, and also serve to dilute the concentrate and supply it to the main tank 20 as needed. In particular, while the concentrate is not being drawn upon for the main tank 20, the circulation pump 63 agitates the concentrate by drawing concentrate from the tank 61 and reinjecting the drawn concentrate back into the tank 61. The reinjection of the concentrate serves to mix the concentrate and keep the Natamycin in suspension. In an embodiment of the invention, the reinjection is by way of a stirring cup 69 as shown in FIG. 7. In particular, the pump 63 withdraws concentrate from the tank 61 and reinjects it into the cup 69. The reinjected concentrate then overflows into the main body of the tank 61. This action serves to agitate the concentrate and keep the Natamycin in suspension.

Figure 8:
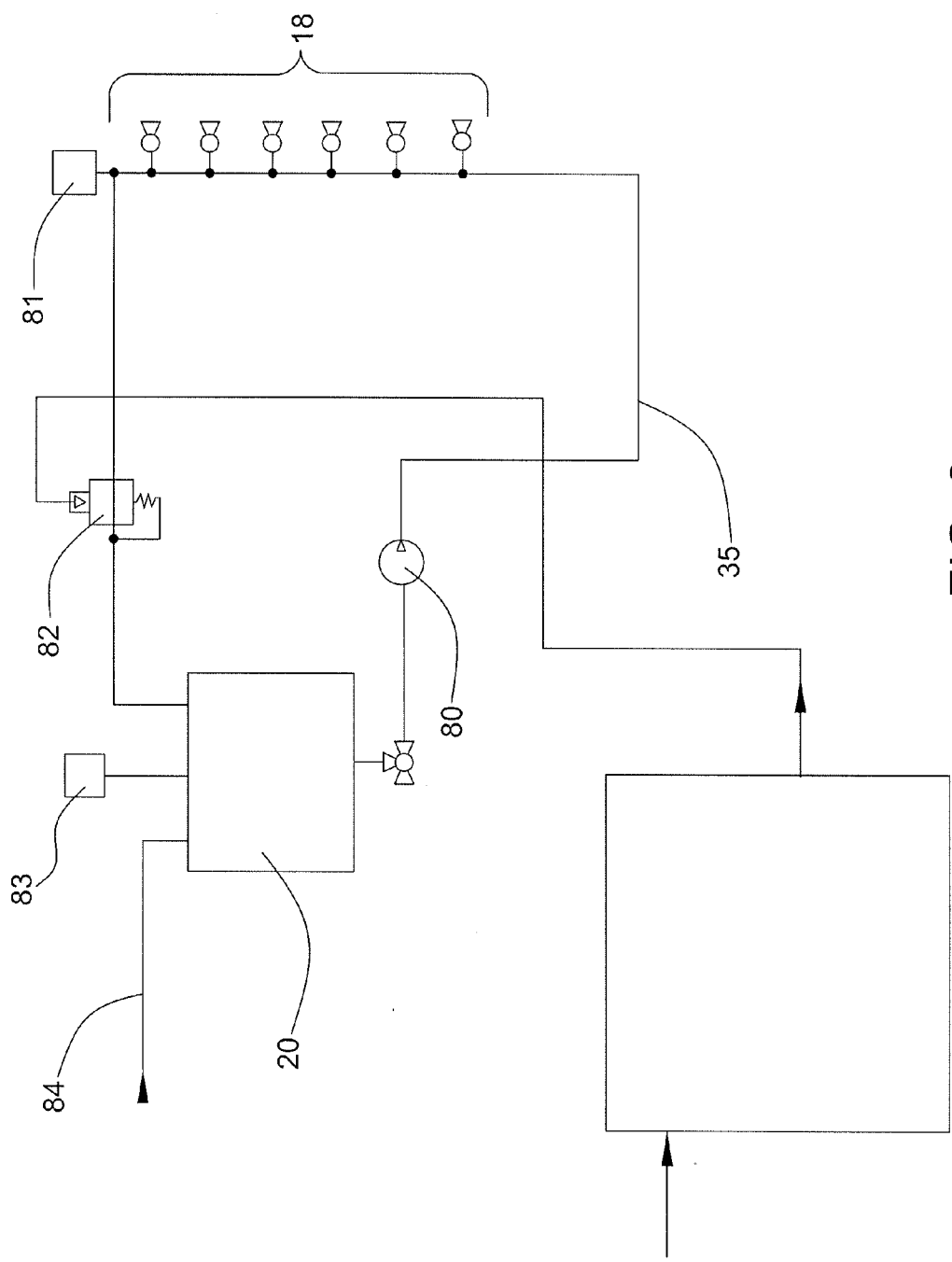
FIG. 8 is a schematic view of a fluid supply system according to an embodiment of the invention.

The schematic diagram for the main system is shown in FIG. 8. The primary components of the system are the main tank 20, a primary pump 80 for supplying mixed fluid to the spray nozzle assemblies 18 via the common liquid supply line 35. A pressure transducer 81 monitors the fluid pressure in the common liquid supply line 35, and constricts or relieves the flow of liquid out of the common liquid supply line 35 to maintain a relatively constant pressure in the line 35. As the fluid in the main tank 20 is exhausted, a level switch 83 detects a falling fluid level and signals the auto refill circuit 64 shown in FIG. 6 to refill the tank 20 via resupply line 84.

Figure 9B:
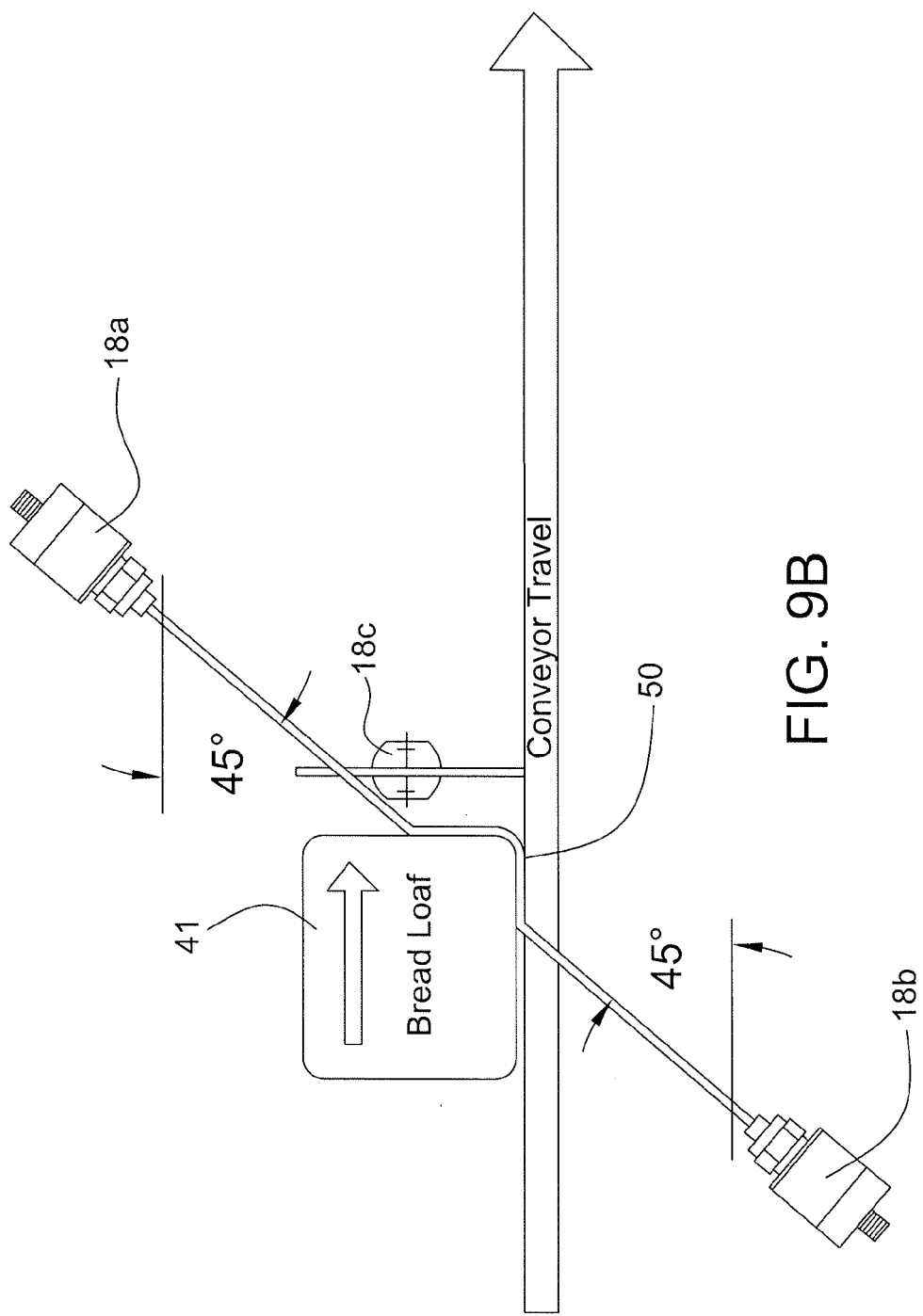
FIG. 9B is a schematic side view of a spray system and product being treated at a second stage according to an embodiment of the invention.
Figure 9C:
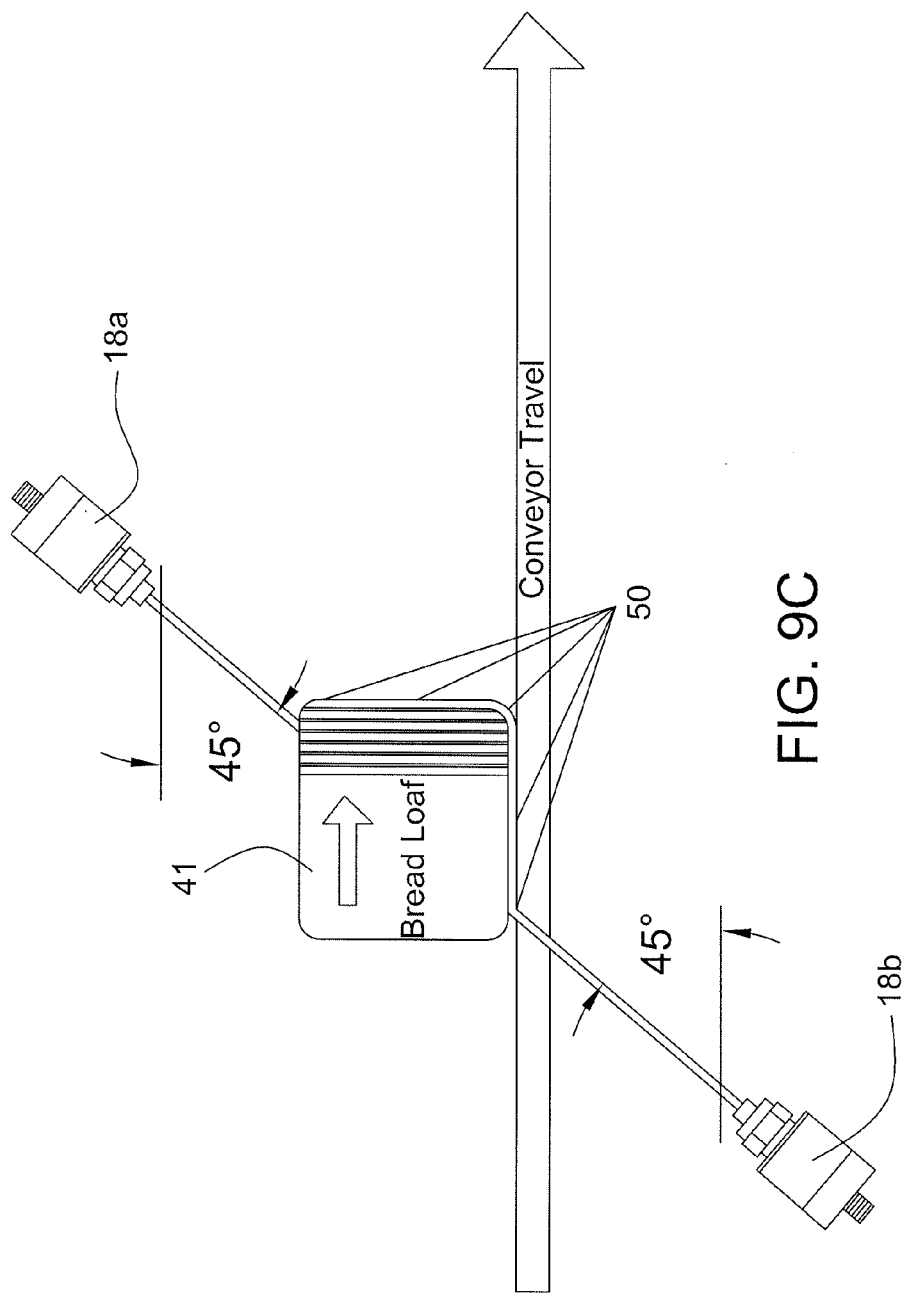
FIG. 9C is a schematic side view of a spray system and product being treated at a third stage according to an embodiment of the invention.

Returning to the mechanical layout of the system, and turning specifically to FIGS. 9A-C, it can be seen that the spray patterns produced by the spray nozzle assemblies 18 are flat and cover the perimeter of the loaf 41 cross-section with very little if any overlap. The orientation of the spray nozzle assemblies 18 can be more clearly seen in FIGS. 9A-C. As shown, the upper spray nozzle assemblies 18a and lower spray nozzle assemblies 18b are aligned such that their flat patterns lie in a common plane that is perpendicular to the page (the second upper 18a and second lower 18b spray nozzle assembly being hidden behind the first in the illustrated perspective).

More importantly, in order to assure even coverage of both vertical and horizontal surfaces of the item being sprayed (i.e., the side surfaces of a loaf (vertical), and the top and bottom of the loaf (horizontal)), it is important to incline the nozzles substantially as shown with respect to the plane of the conveyor 12. In particular, the inventors have found that an inclination of approximately 45 degrees is optimal for ensuring even coverage. It has been observed that a steeper angle results in a higher coverage of horizontal surfaces at the expense of vertical surfaces, and likewise, a shallower angle results in a higher coverage of vertical surfaces at the expense of horizontal surfaces.

Finally, to ensure coverage of the ends of the loaf 41, two end spray nozzle assemblies 18c are situated on either side of the conveyer 12 with the flat plane of the their patterns perpendicular to both the conveyer 12 and the direction of travel. The second end spray nozzle assembly 18c is hidden behind the first in the illustrated perspective.

FIG. 9A illustrates the system before the loaf 41 reaches the antimicrobial spray. In FIG. 9B, the loaf 41 has moved partially through the spray plane created by the upper spray nozzle assemblies 18a and lower spray nozzle assemblies 18b, but has not yet reached the spray pattern created by the end spray nozzle assemblies 18c. At this point, the ends of the loaf 41 have not yet been treated, but a treated portion 50 of the loaf 41 lateral surface is created, and this treated portion 50 increase in extent as the loaf 41 progresses through the spray pattern. In FIG. 9C, the loaf 41 has moved further through the spray plane created by the upper spray nozzle assemblies 18a and lower spray nozzle assemblies 18b, and has now also moved partially through the spray pattern created by the end spray nozzle assemblies 18c. At this point, the ends of the loaf 41 are partially treated, and the treated portion 50 of the loaf lateral surfaces has increased further.

In addition to the novel system configuration and operation, the spray assembly triggering is also executed in a manner that has been devised by the inventors to allow adequate fluid flow, low risk of tip clogging, proper spray pattern and proper spray distribution. In particular, the orifices of the spray nozzles are designed to be larger than any expected granule of Natamycin in suspension, thus ensuring that the nozzles do not clog.

However, such large orifices require a much higher flow rate to pattern the spray appropriately. Moreover, such high flow rates would expose the treated food product to too much moisture, and could also potentially expose the end consumer to too much Natamycin.

To solve this problem, the invention triggers the spray nozzle assemblies 18 via a pulse width modulation scheme, whereby the instantaneous flow rate at any given moment is either zero or is a sufficiently high rate to ensure proper pattern. The duty cycle of the pulse train is adjusted to adjust the time-averaged flow rate. In terms of the wavelength of the pulse pattern, a sufficiently high frequency (short wavelength) is selected so that a very large number of cycles occur during the passage through the system of an item to be treated, thus creating the desired averaged spray effect.

To minimize the atomization of the fluid being sprayed, the spray nozzle assemblies 18 employ hydraulic rather than air driven spraying. With hydraulic spraying, the spray pattern largely excludes any particles of sufficiently small size to drift in ambient air current, i.e., from ductwork, etc. Thus, the fluid is not wasted, and the dosage applied to products can be known with high accuracy, ensuring adequate, but not excessive, application of antimicrobial.

In an embodiment of the invention, an orifice plate is located prior to the flat spray hydraulic tip, and sized appropriately to provide improvement as to the spray distribution. In particular, use of a pre-orifice in this manner will flatten the spray distribution to a degree.

In a further embodiment of the invention, a straightening device is located on the conveyor to improve coverage of the bread loaf products, further minimizing overspray and excess usage of Natamycin. In particular, when a loaf of bread or other item travels down the conveyor, if it is skewed or not perpendicular to the direction of travel, the product detection sensor may obtain an inaccurate length representation of the product. Because of this, the nozzles may spray more fluid than necessary. The same is true regarding centering the loaf on the conveyor in line with the nozzles. When this occurs the nozzles may spray over the edge of one side of the bread wasting that fluid, and missing a section of the loaf on the opposite side. The straightening device straightens the product on the conveyor to minimize these issues.

An additional conveyor may be provided for other bread products such as English muffins, which have a much more random presentation on a conveyor. With this random spacing and placement, it may be efficient to collect excess spray and re-circulate it. This conveyor captures the excess sprayed between the bread products such as English muffins, filters it for contaminants, and introduces it back into the spray solution reservoir. In an embodiment of the invention, a set of two strainers is used in combination with a pressure switch to quickly notify an operator that a change is necessary. A perforated basket catches large particulates that could clog the strainers.

With respect to measuring the amount of Natamycin in the fluid, in an embodiment of the invention, the concentration of Natamycin within water may be measured via a density measurement. In an alternative embodiment of the invention, the concentration of Natamycin within water may be measured via optical means where a known thickness of fluid provides a level of opacity, proportional to the concentration.

In an embodiment of the invention where multiple bread products are present in a pattern, and the pattern is repeatable as well as uniform, each product may be targeted specifically such that reclaim of excess solution is not necessary.

It will be appreciated that a novel and inventive system has been presented for automatically and efficiently treating non-wet food products with a mold inhibitor via uniform spray application in suspended form. This innovation will save on processing costs, due to more efficient use of the antimicrobial agent. In addition, producers and retailers will see higher profit margins due to a lower incidence of spoiled product.

All references herein, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An apparatus for automatically treating a food product with a mold inhibitor via uniform spray application in suspended form, the apparatus comprising:
   a conveyor for moving the food product in a conveyor plane along an axis disposed parallel to the conveyor plane and defining a direction of travel;
   an upper spray nozzle located above the conveyor plane and being oriented to project a flat spray pattern along an upper spray plane toward the conveyor, wherein the upper spray plane is arranged to intersect the conveyor plane at an angle of substantially 45 degrees to the conveyor plane;
   a lower spray nozzle located below the conveyor plane, the lower spray nozzle being aligned with the upper spray nozzle along a sprayer plane that includes the axis defining the direction of travel, the lower spray nozzle being oriented to project a flat spray pattern along a lower spray plane, wherein the upper and lower spray nozzles are aligned such that the upper spray plane and the lower spray plane are parallel;
   one or more end spray nozzles oriented to spray one or more vertical end surfaces of the food product, each of the one or more end spray nozzles being configured to project a respective flat spray pattern along a respective end spray plane that is perpendicular to the conveyor plane and the axis defining the direction of travel; and
   a fluid supply system for supplying pressurized fluid to the spray nozzles, the pressurized fluid being a suspension of the mold inhibitor, and the fluid supply system including a recirculating reservoir for maintaining the mold inhibitor in suspension,
   wherein each spray nozzle has an associated spray gun for spraying fluid through the nozzle and wherein the spray guns are controlled via pulse width modulation such that the instantaneous flow rate through the nozzle is either zero or a flow rate sufficient to form a flat and laterally substantially uniform spray pattern, and wherein the time averaged flow rate is equal to a predetermined allowable flow rate.

2. The apparatus for automatically treating a food product with a mold inhibitor via uniform spray application in suspended form according to claim 1, wherein the food product is a loaf of bread.

3. The apparatus for automatically treating a food product with a mold inhibitor via uniform spray application in suspended form according to claim 1, wherein the food product is a plurality of English muffins.

4. The apparatus for automatically treating a food product with a mold inhibitor via uniform spray application in suspended form according to claim 1, wherein the food product is a cheese product.

5. The apparatus for automatically treating a food product with a mold inhibitor via uniform spray application in suspended form according to claim 1, wherein the food product is one or more tortillas.

6. The apparatus for automatically treating a food product with a mold inhibitor via uniform spray application in suspended form according to claim 1, wherein the mold inhibitor includes Natamycin.

7. The apparatus for automatically treating a food product with a mold inhibitor via uniform spray application in suspended form according to claim 1, wherein the spray gun associated with each spray nozzle for spraying fluid through the nozzle comprises a solenoid control operated spray gun.

8. The apparatus for automatically treating a food product with a mold inhibitor via uniform spray application in suspended form according to claim 1, wherein each spray nozzle includes a preorifice therein.

9. The apparatus for automatically treating a food product with a mold inhibitor via uniform spray application in suspended form according to claim 1, further including a straightener for adjusting an orientation of the food product on the conveyor.

10. The apparatus for automatically treating a food product with a mold inhibitor via uniform spray application in suspended form according to claim 1, further including means for reclaiming overspray.

11. A method for treating a food product with a mold inhibitor via uniform spray application in suspended form, the method comprising:
    moving the food product via a conveyor in a conveyor plane along an axis disposed parallel to the conveyor plane and defining a direction of travel;
    providing an upper spray nozzle located above the conveyor plane and being oriented to project a flat spray pattern along an upper spray plane toward the conveyor, wherein the upper spray plane is arranged to intersect the conveyor plane at an angle of substantially 45 degrees to the conveyor plane;
    providing a lower spray nozzle located below the conveyor plane, the lower spray nozzle being aligned with the upper spray nozzle along a sprayer plane that includes the axis defining the direction of travel, the lower spray nozzle being oriented to project a flat spray pattern along a lower spray plane, wherein the upper and lower spray nozzles are aligned such that the upper spray plane and the lower spray plane are parallel;
    providing one or more end spray nozzles oriented to spray one or more vertical end surfaces of the food product, each of the one or more end spray nozzles being configured to project a respective flat spray pattern along a respective end spray plane that is perpendicular to the conveyor plane and the axis defining the direction of travel;
    activating a fluid supply system to supply pressurized fluid to the spray nozzles, the pressurized fluid being a suspension of the mold inhibitor, and the fluid supply system including a recirculating reservoir for maintaining the mold inhibitor in suspension; and
    actuating a spray gun associated with each spray nozzle to spray fluid through the nozzle such that the time averaged flow rate is equal to a predetermined allowable flow rate.

12. The method according to claim 11, wherein the spray guns are controlled via pulse width modulation such that the instantaneous flow rate through the nozzle is either zero or a flow rate sufficient to form a flat and laterally substantially uniform spray pattern.

13. The method according to claim 11, wherein the food product is a bread product.

14. The method according to claim 11, wherein the food product is a cheese product.

15. The method according to claim 11, wherein the mold inhibitor includes Natamycin.

16. The method according to claim 11, wherein the spray gun associated with each spray nozzle comprises a solenoid control operated spray gun.

17. The method according to claim 11, wherein each spray nozzle includes a preorifice therein.

18. The method according to claim 11, further including adjusting an orientation of the food product on the conveyor.

19. The method according to claim 11, further comprising reclaiming overspray.

20. The method according to claim 10, wherein reclaiming overspray comprises returning the overspray to the fluid supply system.

* * * * *